United States Patent
Martin

[11] Patent Number: 5,536,220
[45] Date of Patent: Jul. 16, 1996

[54] FIVE-SPEED AUTOMATIC TRANSMISSION

[75] Inventor: Berthold Martin, Shelby Township, Mich.

[73] Assignee: Chrysler Corporation, Auburn Hills, Mich.

[21] Appl. No.: 271,314

[22] Filed: Jul. 6, 1994

[51] Int. Cl.⁶ .................................................. F16H 3/66
[52] U.S. Cl. ......................... 475/275; 475/276; 475/279
[58] Field of Search ................................. 475/275, 276, 475/279, 280, 282, 284, 286, 288, 290

[56] References Cited

U.S. PATENT DOCUMENTS

| | | | |
|---|---|---|---|
| 3,811,343 | 5/1974 | Mori et al. | 475/285 |
| 3,956,946 | 5/1976 | Murakami et al. | 475/276 |
| 4,027,552 | 6/1977 | Murakami et al. | 475/280 |
| 4,875,391 | 10/1989 | Leising et al. | 475/280 |
| 5,071,398 | 12/1991 | Hotta et al. | 475/276 |
| 5,188,575 | 2/1993 | Leising et al. | 475/280 |

FOREIGN PATENT DOCUMENTS

| | | |
|---|---|---|
| 2483553 | 12/1981 | France . |
| 2-129447 | 5/1990 | Japan . |
| 404029652 | 1/1992 | Japan ..................................... 475/276 |
| 2249361 | 5/1992 | United Kingdom . |

OTHER PUBLICATIONS

Powerful Revolution: Three New V–8 Models Launch the BMW 5–Series for 1994; BMW of North America, Inc. Press Release.

BMW 540i In Which a Good Eight Replaces a Great Six in the Old Five; by John Phillips; Sep. 1993; pp. 79–82.

*Primary Examiner*—Khoi G. Ta
*Attorney, Agent, or Firm*—Thomas G. Pasternak

[57] ABSTRACT

A five-speed automatic transmission for a vehicle includes a transmission housing, an input member, an output member, a plurality of planetary gearsets for changing a ratio of torque between the input member and the output member, a plurality of clutch assemblies to selectively couple the input member to predetermined gears of the planetary gearsets, a plurality of brake assemblies to selectively couple predetermined gears of the planetary gearsets to the transmission housing, and a structure for allowing the output member and a planetary carrier for one of the planetary gearsets and an annulus gear of two other of the planetary gearsets to rotate simultaneously.

19 Claims, 1 Drawing Sheet

| GEAR | | GEAR RATIO | C1 | C2 | C3 | C4 | C5 | C6 |
|---|---|---|---|---|---|---|---|---|
| 1 | R2+1 | 3.55 | X | | | | X | |
| 2 | (R2+1) − R2(R3/R3+1) | 2.00 | X | | | | | X |
| 3 | (R2+1) − R2(R1/R1+1) | 1.61 | X | | | X | | |
| 4 | 1.00 | 1.00 | X | X | | | | |
| 5 | R1/R1+1 | 0.76 | | X | | X | | |
| REV | −R1 | −3.17 | | | X | | X | |
| Planetary Size | R1 | 3.00 | | | | | | |
| | R2 | 3.00 | | | | | | |
| | R3 | 1.55 | | | | | | |

- 4 Speed Underdrive
- 5 Speed Overdrive 5,536,220

FIVE-SPEED AUTOMATIC TRANSMISSION

BACKGROUND OF THE INVENTION

1. Field of the Invention

The present invention relates generally to automatic transmissions for vehicles and, more particularly, to a five-speed automatic transmission for an automotive vehicle.

2. Description of the Related Art

A conventional automatic transmission includes a hydrodynamic torque converter to transfer engine torque from an engine crankshaft to a rotatable input member of the transmission through fluid-flow forces. The transmission also includes frictional units, typically referred to as clutches, which couple the rotatable input member to one or more members of a planetary gearset. Other frictional units, typically referred to as brakes, hold one or more members of the planetary gearset stationary during flow of power. Such transmissions also typically provide for one or more planetary gearsets in order to provide various ratios of torque and to ensure that the available torque and the respective tractive power demand are matched to each other.

An example of an automatic transmission having a plurality of planetary gearsets is a ZF five-speed automatic transmission (5 HP 30) commercially available from Zahnradfabrik Friedrichshafen AG of Germany and found on the 1994 BMW 540i vehicles. The ZF five-speed automatic transmission includes a torque converter with a lock-up clutch, three drive clutch assemblies, three brake assemblies, and three planetary gearsets.

One disadvantage of the above ZF five-speed automatic transmission is that the arrangement of the planetary gearsets does not provide close ratio spacing in second through fifth gears. Another disadvantage of the ZF five-speed automatic transmission is that the planetary gearsets require freewheels for 2–3, 3–4 and 4–5 shifts. Yet another disadvantage of the ZF five-speed automatic transmission is that it is not readily adaptable to provide an efficient design of either a four-speed underdrive or a four-speed overdrive automatic transmission.

SUMMARY OF THE INVENTION

It is, therefore, one object of the present invention to provide a five-speed automatic transmission for an automotive vehicle.

It is another object of the present invention to provide a five-speed automatic transmission that has a plurality of planetary gearsets arranged to provide close ratio spacing in second through fifth gears.

It is yet another object of the present invention to provide a five-speed automatic transmission with a unique planetary gearset arrangement which, relative to today's five-speed units, eliminates the use of freewheels for 2–3, 3–4 and 4–5 shifts.

It is a further object of the present invention to provide a five-speed automatic transmission with ready flexibility for use as a four-speed overdrive automatic transmission, four-speed underdrive automatic transmission or a five-speed overdrive automatic transmission.

To achieve the foregoing objects, the present invention is a five-speed automatic transmission for a vehicle including a transmission housing, an input member, an output member, a plurality of planetary gearsets for changing a ratio of torque between the input member and the output member, a plurality of clutch assemblies to selectively couple the input member to predetermined gears of the planetary gearsets, a plurality of brake assemblies to selectively couple predetermined gears of the planetary gearsets to the transmission housing, and means for allowing the output member and a planetary carrier from one of the planetary gearsets and an annulus gear of two other planetary gearsets to rotate simultaneously.

One advantage of the present invention is that a five-speed automatic transmission is provided for an automotive vehicle. Another advantage of the present invention is that the five-speed automatic transmission uses an additional planetary gearset and frictional element to expand a four-speed overdrive automatic transmission to a five-speed overdrive automatic transmission or a four-speed underdrive automatic transmission. Still another advantage of the present invention is that the five-speed automatic transmission has a plurality of planetary gearsets arranged to provide close ratio spacing in second through fifth gears. A further advantage of the present invention is that the five-speed automatic transmission has a plurality of planetary gearsets arranged to provide close ratio spacing such that freewheels are not needed for 2–3, 3–4 and 4–5 shifts.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figures 1, 2:
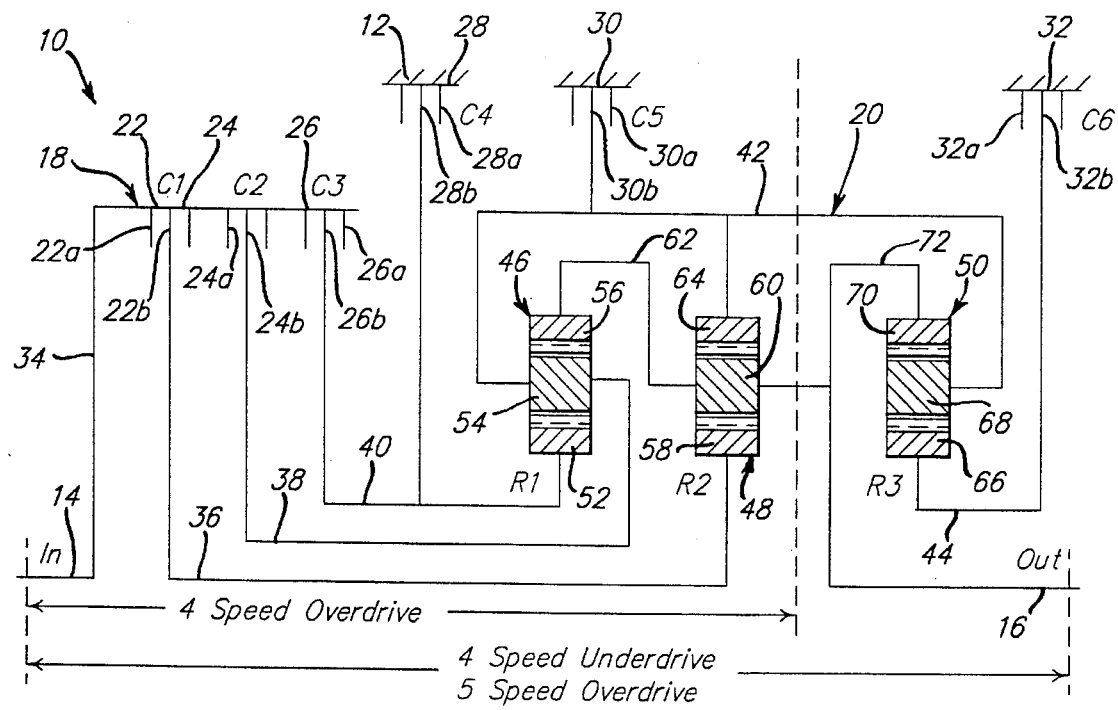
FIG. 1 is a cross-sectional schematic view of a five-speed automatic transmission according to the present invention.
FIG. 2 is a chart of gears, gear ratio, and clutches and brakes engaged for the five-speed automatic transmission of FIG. 1.

Referring to FIG. 1, a cross-sectional schematic of a five-speed automatic transmission, according to the present invention, is partially shown at 10. The five-speed automatic transmission 10 is adapted for use in a vehicle (not shown) such as an automotive vehicle. The five-speed automatic transmission 10 is based on a four-speed overdrive automatic transmission disclosed in U.S. Pat. No. 4,875,391, the disclosure of which is hereby incorporated by reference, except to that specifically illustrated and described herein.

The five-speed automatic transmission 10 includes a transmission housing 12, an input member 14, an output member 16, a multi-clutch and brake assembly, generally indicated at 18, and a gear assembly, generally indicated at 20. The transmission housing 12 is stationary relative to the rotatable input member 14, output member 16 and gear assembly 20.

The multi-clutch and brake assembly 18 allows predetermined gears within the gear assembly 20 to be selectively engaged and disengaged from either the input member 14 or the transmission housing 12. Near the input side of the transmission 10, the multi-clutch and brake assembly 18 includes an underdrive clutch assembly 22 (applied in first, second, third and fourth gears), an overdrive clutch assembly 24 (applied in fourth and fifth gears) and a reverse clutch assembly 26 (applied in reverse gear). Near the output side of the transmission 10, the multi-clutch and brake assembly 18 includes a three/five (3/5) brake assembly 28 (applied in third and fifth gears), a low-reverse brake assembly 30

(applied in first and reverse gears) and a second brake assembly 32 (applied in second gear).

The underdrive clutch assembly 22 includes a plurality of axially spaced annular plates 22a and a plurality of axially spaced annular discs 22b which are alternated between the plates 22a and when the underdrive clutch assembly 22 is not applied, these plates 22a and discs 22b are free to move or rotate relative to each other. The plates 22a are mounted to an input retainer 34 operatively connected to the input member 14. The discs 22b are mounted to an underdrive hub 36 operatively connected to the gear assembly 20.

The overdrive clutch assembly 24 includes a plurality of axially spaced annular plates 24a and a plurality of axially spaced annular discs 24b. The plates 24a and discs 24b are similar to those of the underdrive clutch assembly 22. The plates 24a are mounted to the input retainer 34 and the discs 24b are mounted to an overdrive hub 38 operatively connected to the gear assembly 20.

The reverse clutch assembly 26 includes a plurality of axially spaced annular plates 26a and a plurality of axially spaced annular discs 26b. The plates 26a and discs 26b are similar to those of the underdrive clutch assembly 22. The plates 26a are mounted to the input retainer 34 and the discs 26b are mounted to a reverse hub 40 operatively connected to the gear assembly 20. It should be appreciated that the clutch assemblies 22, 24 and 26 are applied by fluid actuating devices (not shown).

The three/five brake assembly 28 includes a plurality of axially spaced annular plates 28a and a plurality of axially spaced annular discs 28b. The plates 28a and discs 28b are similar to those of the underdrive clutch assembly 22. The plates 28a are mounted to the transmission housing 12 and the discs 28b are mounted to the reverse hub 40.

The low-reverse brake assembly 30 includes a plurality of axially spaced annular plates 30a and a plurality of axially spaced annular discs 30b. The plates 30a and discs 30b are similar to those of the underdrive clutch assembly 22. The plates 30a are mounted to the transmission housing 12 and the discs 30b are mounted to a first connecting member 42 of the gear assembly 20 to be described further herein.

The second brake assembly 32 includes a plurality of axially spaced annular plates 32a and a plurality of axially spaced annular discs 32b. The plates 32a and discs 32b are similar to those of the underdrive clutch assembly 22. The plates 32a are mounted to the transmission housing 12 and the discs 32b are mounted to a second hub 44 operatively connected to the gear assembly 20. It should be appreciated that the brake assemblies 28, 30 and 32 are applied by fluid actuating devices (not shown).

The gear assembly 20 includes a front or first planetary gearset, generally indicated at 46, an axially spaced intermediate or second planetary gearset, generally indicated at 48, and an axially spaced rear or third planetary gearset, generally indicated at 50. The first planetary gearset 46 includes a first sun gear 52 at its center. The first sun gear 52 is connected to the reverse hub 40. The first planetary gearset 46 also includes a first planetary carrier 54 having a plurality of circumferentially spaced first pinion gears to engage the first sun gear 52. The first planetary carrier 54 is connected to the overdrive hub 38. The first planetary gearset 46 further includes a first annulus gear 56 disposed about the first planetary carrier 54 and which engages the first pinion gears. The first annulus gear 56 is connected to the second planetary gearset 48 to be described.

The intermediate or second planetary gearset 48 includes a second sun gear 58 at its center which is connected to the underdrive hub 36. The second planetary gearset 48 also includes a second planetary carrier 60 having a plurality of circumferentially spaced second pinion gears to engage the second sun gear 58. The second planetary gearset 48 includes a second flange member 62 interconnecting the first annulus gear 56 and the second planetary carrier 60. The second planetary gearset 48 further includes a second annulus gear 64 disposed about the second planetary carrier 60 and which engages the second pinion gears. The second annulus gear 64 is connected to the first connecting member 42.

The rear or third planetary gearset 50 includes a third sun gear 66 at its center which is connected to the second hub 44. The third planetary gearset 50 also includes a third planetary carrier 68 having a plurality of circumferentially spaced third pinion gears to engage the third sun gear 66. The third planetary carrier 68 is connected to the first connecting member 42. The third planetary gearset 50 further includes a third annulus gear 70 disposed about the third planetary carrier 68 and which engages the third pinion gears. The third annulus gear 70 includes a third connecting member 72 connected to the second planetary carrier 60 and to the output member 16 of the transmission 10.

In operation, the input member 14 of the transmission 10 rotates due to torque being transferred from the rotating crankshaft of the engine and through the torque converter (not shown) to the input member 14. The input retainer 34 also rotates with the input member 14 due to its connection. The input retainer 34 and plates 22a, 24a, 26a also rotate with the input member 14 due to the connection of the input retainer 34 to the input member 14.

When the underdrive clutch assembly 22 is applied, the rotating plates 22a and discs 22b of the underdrive clutch assembly 22 engage each other and a frictional force is produced between the plates 22a and discs 22b. Because the input retainer 34 and plates 22a are rotating, the frictional force causes the discs 22b and underdrive hub 36 to rotate, in turn, rotating the second sun gear 58 of the second planetary gearset 48.

When the overdrive clutch assembly 24 is applied, the rotating plates 24a and discs 24b of the overdrive clutch assembly 24 engage each other and a frictional force is produced between the plates 24a and discs 24b. Because the input retainer 34 and plates 24a are rotating, the frictional force causes the discs 24b and overdrive hub 38 to rotate, in turn, rotating the first planetary carrier 54, first connecting member 42, second annulus gear 64 and third planetary carrier 68.

When the reverse clutch assembly 26 is applied, the rotating plates 26a and discs 26b of the reverse clutch assembly 26 engage each other and a frictional force is produced between the plates 26a and discs 26b. Because the input retainer 34 and plates 26a are rotating, the frictional force causes the discs 26b and reverse hub 40 to rotate, in turn, rotating the first sun gear 52 of the first planetary gearset 46.

When the three/five brake assembly 28 is applied, the plates 28a and discs 28b of the three/five brake assembly 28 engage each other and a frictional force is produced between the plates 28a and discs 28b. Because the plates 28a do not rotate or are stationary, as they are connected to the transmission housing 12, the frictional force holds the discs 28b and reverse hub 40 stationary, in turn, holding the first sun gear 52 of the first planetary gearset 46 stationary.

When the low/reverse brake assembly 30 is applied, the plates 30a and discs 30b of the low/reverse brake assembly 30 engage each other and a frictional force is produced between the plates 30a and discs 30b. Because the plates 30a are stationary, as they are connected to the transmission housing 12, the frictional force holds the discs 30b stationary, in turn, holding the first connecting member 42, first planetary carrier 54, second annulus gear 64 and third planetary carrier 68.

When the second brake assembly 32 is applied, the plates 32a and discs 32b of the second brake assembly 32 engage each other and a frictional force is produced between the plates 32a and discs 32b. Because the plates 32a are stationary, as they are connected to the transmission housing 12, the frictional force holds the discs 32b stationary, in turn, holding the second hub 44 and third sun gear 66 of the third planetary gearset 50 stationary.

Referring to FIG. 2, when the transmission 10 is desired to operate in first gear, the underdrive clutch assembly 22 and low/reverse brake assembly 30 are applied. This causes the second sun gear 58 to rotate and the second annulus gear 64 to be held stationary. As a result, rotation of the second sun gear 58 causes rotation of the second pinion gears and the second planetary carrier 60. Because the output member 16 is connected to the second planetary carrier 60 through the third connecting member 72, rotation of the second planetary carrier 60 causes the output member 16 to rotate. This arrangement of the gear assembly 20 produces a gear ratio of 3.55.

When the transmission 10 is desired to operate in second gear, the underdrive clutch assembly 22 and the second brake assembly 32 are applied. This causes the second sun gear 58 to rotate and the third sun gear 66 to be held stationary. By holding the third sun gear 66 stationary, the second planetary carrier 60, first annulus gear 56, first planetary carrier 54, second annulus gear 64 and third planetary carrier 64 rotate, in turn, further rotating the third annulus gear 70 which increases the speed of the output member 16. As a result, the output member 16 rotates at a greater r.p.m. than in first gear. This arrangement of the gear assembly 20 produces a gear ratio of 2.00.

When the transmission 10 is desired to operate in third gear, the underdrive clutch assembly 22 and the three/five brake assembly 28 are applied. This causes the second sun gear 58 to rotate and the first sun gear 52 to be held stationary. As a result, rotation of the second sun gear 58 causes the second planetary carrier 60, and first annulus gear 62 to rotate. By holding the first sun gear 52 stationary, the first planetary carrier 54, second annulus gear 64 and third planetary carrier 68 rotate, in turn, rotating the third annulus gear 70 and second planetary carrier 60 which increase in speed. As a result, the second planetary carrier 60 and third annulus gear 70 rotate the output member 16 at a greater r.p.m. than in second gear. This arrangement of the gear assembly 20 produces a gear ratio of 1.61.

When the transmission 10 is desired to operate in fourth gear, the underdrive clutch assembly 22 and the overdrive clutch assembly 24 are applied. This causes the second sun gear 58 and first planetary carrier 54, second annulus gear 64 and third planetary carrier 68 to rotate. Since the first planetary carrier 54, second annulus gear 64 and third planetary carrier 68 rotate, the first annulus gear 56, second planetary carrier 60 and third annulus gear 70 also rotate. As a result, the output member 16 rotates at a higher r.p.m. than in third gear. This arrangement of the gear assembly 20 produces a gear ratio of 1.00.

When the transmission 10 is desired to operate in fifth gear, the overdrive clutch assembly 24 and the three/five brake assembly 28 are applied. This causes the first planetary carrier 54, second annulus gear 64 and third planetary carrier 68 to rotate and the first sun gear 52 to be held stationary. As a result, the first annulus gear 56, second planetary carrier 60 and third annulus gear 70 rotate which, in turn, rotates the output member 16 at a greater r.p.m. than in fourth gear. This arrangement of the gear assembly 20 produces a gear ratio of 0.76.

When the transmission 10 is desired to operate in reverse gear, the reverse clutch assembly 26 and low/reverse brake assembly 30 are applied. This causes the first sun gear 52 to rotate and the first planetary carrier 54, second annulus gear 64 and the third planetary carrier 68 to be held stationary. As a result, the first sun gear 52 rotates the first pinion gears which, in turn, rotate the first annulus gear 56 backwards. Rotation of the first annulus gear 56 causes the second planetary carrier 60 and second pinion gears to rotate which, in turn, causes rotation of the output member 16 in a direction opposite to the other gear positions. This arrangement of the gear assembly 20 produces a gear ratio of –3.17.

As illustrated in FIG. 2, the transmission 10 has a planetary size of 3.00 for the first planetary gearset 46, 3.00 for the second planetary gearset 48 and 1.55 for the third planetary gearset 50. Also, the transmission 10 may be operated as a four-speed underdrive automatic transmission when only gears one through four are used and controlled through algorithms similar to those disclosed in U.S. Pat. No. 4,875,391.

Accordingly, the five-speed automatic transmission 10 has a unique arrangement of the planetary gearsets 46, 48 and 50 to achieve a 0.76 overdrive ratio in fifth gear. The unique arrangement of the planetary gearsets 46, 48 and 50 results in either a four-speed underdrive automatic transmission or a five-speed overdrive automatic transmission.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A five-speed automatic transmission for a vehicle comprising:

a transmission housing;

an input member;

an output member;

a plurality of planetary gearsets for changing a ratio of torque between said input member and said output member;

a plurality of clutch assemblies to selectively couple said input member to predetermined gears of said planetary gearsets and a plurality of brake assemblies to selectively couple predetermined gears of said planetary gearsets to said transmission housing; and means for allowing said output member and a planetary carrier from one of said planetary gearsets and an annulus gear of two other of said planetary gearsets to rotate at the same velocity and direction.

2. A five-speed automatic transmission as set forth in claim 1 wherein said planetary gearsets comprises a first planetary gearset, a second planetary gearset axially spaced from said first planetary gearset and a third planetary gearset axially spaced from said second planetary gearset.

3. A five-speed automatic transmission as set forth in claim 2 wherein each of said first, second and third planetary gearsets comprises a sun gear, an annulus gear and a planetary carrier having a plurality of circumferentially spaced pinion gears disposed between said sun gear and said annulus gear.

4. A five-speed automatic transmission as set forth in claim 3 including means for allowing said planetary carrier of said first planetary gearset and said annulus gear of said second planetary gearset and said planetary carrier of said third planetary gearset to rotate at the same velocity and direction or remain stationary.

5. A five-speed automatic transmission as set forth in claim 3 wherein said clutch assemblies comprise a first clutch assembly to couple said input member to said sun gear of said second planetary gearset, a second clutch assembly to couple said input member to said planetary carrier of said first planetary gearset, and a third clutch assembly to couple said input member to said sun gear of said first planetary gearset.

6. A five-speed automatic transmission as set forth in claim 3 wherein said brake assemblies comprise a first brake assembly to couple said transmission housing to said sun gear of said first planetary gearset, a second brake assembly to couple said transmission housing to said planetary carrier of said first planetary gearset and said annulus gear of said second planetary gearset and said planetary carrier of said third planetary gearset, and a third brake assembly to couple said transmission housing to said sun gear of said third planetary gearset.

7. A gear assembly for an automatic transmission of a vehicle for changing a ratio of torque between an input member and an output member, said gear assembly comprising:

a first planetary gearset;

a second planetary gearset axially spaced from said first planetary gearset;

a third planetary gearset axially spaced from said second planetary gearset;

each of said first and second and third planetary gearsets comprising a sun gear, an annulus gear and a planetary carrier having a plurality of circumferentially spaced pinion gears disposed between said sun gear and said annulus gear;

means for allowing said annulus gear of said first planetary gearset and said planetary carrier of said second planetary gearset and said annulus gear of said third planetary gearset to rotate at the same velocity and direction; and means for allowing said planetary carrier of said first planetary gearset and said annulus gear of said second planetary gearset and said planetary carrier of said third planetary gearset to remain stationary or to rotate at the same velocity and direction.

8. A gear assembly as set forth in claim 7 wherein said means comprises at least one connecting member interconnecting said annulus gear of said first planetary gearset and said planetary carrier of said second planetary gearset and said annulus gear of said third planetary gearset.

9. A gear assembly as set forth in claim 7 wherein said means comprises at least one connecting member interconnecting said planetary carrier of said first planetary gearset and said annulus gear of said second planetary gearset and said planetary carrier of said third planetary gearset.

10. A five-speed automatic transmission for a vehicle comprising:

a transmission housing;

an input member;

an output member;

a first planetary gearset;

a second planetary gearset axially spaced from said first planetary gearset;

a third planetary gearset axially spaced from said second planetary gearset;

said first and second and third planetary gearsets comprising a sun gear, an annulus gear and a planetary carrier having a plurality of circumferentially spaced pinion gears disposed between said sun gear and said annulus gear;

means for allowing said output member and said annulus gear of said first planetary gearset and said planetary carrier of said second planetary gearset and said annulus gear of said third planetary gearset to rotate at the same velocity and direction; and a third brake assembly to selectively couple said sun gear of said third planetary gearset to said transmission housing to remain stationary.

11. A five-speed automatic transmission as set forth in claim 10 including means for allowing said planetary carrier of said first planetary gearset and said annulus gear of said second planetary gearset and said planetary carrier of said third planetary gearset to remain stationary or to rotate at the same velocity.

12. A five-speed automatic transmission as set forth in claim 10 including a first brake assembly to selectively couple said sun gear of said first planetary gearset to said transmission housing to remain stationary.

13. A five-speed automatic transmission as set forth in claim 10 including a second brake assembly to selectively couple said planetary carrier of said first planetary gearset and said annulus gear of said second planetary gearset and said planetary carrier of said third planetary to said transmission housing to remain stationary.

14. A five-speed automatic transmission as set forth in claim 10 including a first clutch assembly to selectively couple said input member to said sun gear of said second planetary gearset.

15. A five-speed automatic transmission as set forth in claim 10 including a second clutch assembly to selectively couple said input member to said planetary carrier of said first planetary gearset.

16. A five-speed automatic transmission as set forth in claim 10 including a third clutch assembly to selectively couple said input member to said sun gear of said first planetary gearset.

17. A gear assembly as set forth in claim 10 wherein said means comprises at least one connecting member interconnecting said annulus gear of said first planetary gearset and said planetary carrier of said second planetary gearset and said annulus gear of said third planetary gearset.

18. A gear assembly as set forth in claim 11 wherein said means comprises at least one connecting member interconnecting said planetary carrier of said first planetary gearset and said annulus gear of said second planetary gearset and said planetary carrier of said third planetary gearset.

19. A five-speed automatic transmission for a vehicle comprising:

a transmission housing;

an input member;

an output member;

a first planetary gearset;

a second planetary gearset axially spaced from said first planetary gearset;

a third planetary gearset axially spaced from said second planetary gearset;

said first and second and third planetary gearsets comprising a sun gear, an annulus gear and a planetary carrier having a plurality of circumferentially spaced pinion gears disposed between said sun gear and said annulus gear;

means for allowing said output member and said annulus gear of said first planetary gearset and said planetary carrier of said second planetary gearset and said annulus gear of said third planetary gearset to rotate at the same velocity and direction;

means for allowing said planetary carrier of said first planetary gearset and said annulus gear of said second planetary gearset and said planetary carrier of said third planetary gearset to remain stationary or to rotate at the same velocity and direction;

a first brake assembly to selectively couple said sun gear of said first planetary gearset to said transmission housing to remain stationary;

a second brake assembly to selectively couple said planetary carrier of said first planetary gearset and said annulus gear of said second planetary gearset and said planetary carrier of said third planetary gearset to said transmission housing to remain stationary;

a third brake assembly to selectively couple said sun gear of said third planetary gearset to said transmission housing to remain stationary;

a first clutch assembly to selectively couple said input member to said sun gear of said second planetary gearset;

a second clutch assembly to selectively couple said input member to said planetary carrier of said first planetary gearset; and a third clutch assembly to selectively couple said input member to said sun gear of said first planetary gearset.

* * * * *